(12) United States Patent
Friedhoff et al.

(10) Patent No.: US 8,059,898 B2
(45) Date of Patent: Nov. 15, 2011

(54) METHOD AND SYSTEM FOR LEARNING OBJECT RECOGNITION IN IMAGES

(75) Inventors: Richard Mark Friedhoff, San Francisco, CA (US); Bruce Allen Maxwell, Benton, ME (US)

(73) Assignee: Tandent Vision Science, Inc., San Francisco, CA (US)

( * ) Notice: Subject to any disclaimer, the term of this patent is extended or adjusted under 35 U.S.C. 154(b) by 0 days.

(21) Appl. No.: 12/925,657

(22) Filed: Oct. 25, 2010

(65) Prior Publication Data

US 2011/0075918 A1 Mar. 31, 2011

Related U.S. Application Data

(62) Division of application No. 11/600,624, filed on Nov. 16, 2006, now Pat. No. 7,853,071.

(51) Int. Cl.
*G06K 9/00* (2006.01)
(52) U.S. Cl. ........................................ 382/181; 382/155
(58) Field of Classification Search .................. 382/155, 382/156, 170, 181, 224
See application file for complete search history.

(56) References Cited

U.S. PATENT DOCUMENTS

| | | | | |
|---|---|---|---|---|
| 5,787,201 | A | 7/1998 | Nelson et al. | 382/224 |
| 5,872,867 | A | 2/1999 | Bergen | 382/254 |
| 6,038,337 | A | 3/2000 | Lawrence et al. | 382/156 |
| 6,594,384 | B1 | 7/2003 | Seo et al. | 382/162 |
| 7,024,033 | B2 | 4/2006 | Li et al. | 382/159 |
| 7,657,089 | B2 * | 2/2010 | Li et al. | 382/170 |
| 2006/0177149 | A1 | 8/2006 | Friedhoff et al. | 382/274 |
| 2007/0086649 | A1 | 4/2007 | Yang et al. | 382/159 |
| 2007/0127816 | A1 | 6/2007 | Balslev et al. | 382/181 |

OTHER PUBLICATIONS

Comaniciu, D., and Meer, P. "Mean Shift Analysis and Applications." *The Proceedings of the Seventh IEEE International Conference on Computer Vision*. 1999, vol. 2.
Finlayson, G. D., Hordley, S. D., Lu, C., and Drew, M. S. "On the Removal of Shadows From Images." *IEEE Transactions on Pattern Analysis and Machine Vision*. 2006, vol. 28, No. 1, pp. 59 to 68.
Freund, Y. and Schapire, R. "A Decision-Theoretic Generalization of On-Line Learning and an Application to Boosting." *Journal of Computer and System Sciences*. Aug. 1997, vol. 55, No. 1, pp. 119 to 139.
Holub, A. and Perona, P. "A Discriminative Framework for Modelling Object Classes." *Proceedings of the 2005 IEEE Conference on Computer Vision and Pattern Recognition (CVPR '05)*. Jun. 2005, vol. 1.
Khan, E. A., Fleming, R., and Buelthoff, H. "Image-Based Material Editing." Association for Computing Machinery (ACM) Special Interest Group on Graphics and Interactive Techniques (SIGGRAPH) 2006 Papers, vol. 25, Issue 3.
Langer, M. S. and Zucker, S. W. "Shape-From-Shading on a Cloudy Day." *Journal of the Optical Society of America A*. Feb. 1994, vol. 11, No. 2, pp. 467-478.

(Continued)

*Primary Examiner* — Tom Y Lu
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method for learning object recognition in an image is provided. According to a feature of the present invention, the method comprises the steps of providing a training set of standard images, calculating intrinsic images corresponding to the standard images and building a classifier as a function of the intrinsic images.

2 Claims, 12 Drawing Sheets

OTHER PUBLICATIONS

Nayar, S. K., Krishnan, G., Grossberg, M. D., and Raskar, R. "Fast Separation of Direct and Global Components of a Scene using High Frequency Illumination." Association for Computing Machinery (ACM) Special Interest Group on Graphics and Interactive Techniques (SIGGRAPH) 2006 Papers, vol. 25, Issue 3.

Nayar, S. K., Nene, S. A., and Murase, H. "Real-Time 100 Object Recognition System." *Proceedings of the 1996 IEEE International Conference on Robotics and Automation.* Apr. 1996, vol. 3., pp. 2321 to 2325.

Nishino, K. and Nayar, S. K. "Eyes for Relighting." *ACM Transactions on Graphics.* Association for Computing Machinery (ACM) Special Interest Group on Graphics and Interactive Techniques (SIGGRAPH) 2004, vol. 23, Issue3.

Prados, E. and Faugeras, O. "Shape From Shading: a well-posed problem?" *Proceedings of the 2005 IEEE Conference on Computer Vision and Pattern Recognition (CVPR '05).* Jun. 2005, vol. 2.

Rowley, H. A., Baluja, S., and Kanade, T. "Neural Network-Based Face Detection." *IEEE Transactions on Pattern Analysis and Machine Intelligence.* Jan. 1998, vol. 20, No. 1.

Tappen, M. F., Adelson, E. H., and Freeman, W. T. "Estimating Intrinsic Component Images using Non-Linear Regression." *Proceedings of the 2006 IEEE Computer Society Conference on Computer Vision and Pattern Recognition (CVPR '06).* Jun. 2006, vol. 2.

Tappen, M. F., Freeman, W. T., and Adelson, E. H. "Recovering Intrinsic Images from a Single Image." *IEEE Transanctions on Pattern Analysis and Machine Intelligence.* Sep. 2005, vol. 27, No. 9.

Tu, Z. "Probabilistic Boosting-Tree: Learning Discriminative Models for Classification, Recognition, and Clustering." *Tenth IEEE International Conference on Computer Vision, 2005.* Oct. 2005, vol. 2.

Viola, P. and Jones, M. "Rapid Object Detection using a Boosted Cascade of Simple Features." *Proceedings of the 2001 IEEE Computer Society Conference on Computer Vision and Pattern Recognition.* 2001, vol. 1.

Worthington, P. L. and Hancock, E. R. "Object Recognition Using Shape-from Shading." *IEEE Transactions on Pattern Analysis and Machine Intelligence.* May 2001, vol. 23, No. 5, pp. 535 to 542.

K. Barnard and G. Finlayion, *Shadow Identification Using Colour Ratios*, 2002.

K. Barnard, G.D. Finlayson and B. Funt, *Color Constancy for Scenes with Varying Illumination*, Computer Vision and Image Understanding, 65(2): 311-321, Feb. 1997.

H.G. Barrow and J.M. Tenenbaum, *Recovering Intrinsic Scene Characteristics from Imag*, Computer Vision Systems, pp. 3-26, 1978.

C.F. Borges, *A Trichromatic Approximation Method for Surface Illumination*, J. Opt. Soc.Am. A, 8(8): 1319-1323., Aug. 1991.

M.S. Drew, G.D. Finlayson and S.D. Horley, *Recovery of Chromaticity Image Free from Shadows via Illumination Invariance*, Proceedings of IEEE Workshop on Color and Photometric Methods in Computer Vision, Nice, France 2003, pp. 32-39.

G.D. Finlayson, S.D. Horley and M.S. Drew, *Removing Shadows from Images*, 2002, pp. 2-14.

G. Finlayson,. *On the Removal of Shadows From Images* IEEE Transactions on Pattern Analysis and Machine Intelligence. Jan. 2006, vol. 28, No. 1, pp. 59 to 68.

G. Finlayson et al., *Intrinsic Images by Entropy Minimization*, May 2004: European Conference on Computer Vision, Prague, May 2004. Springer Lecture Notes in Computer Science, vol. 3023, pp. 582 to 595.

G. Finlayson. et al., *Color constancy at a pixel.*, J. Opt. Soc.Am. A. vol. 18, No. 2, Feb. 2001, pp. 253-264.

G.D. Funklea and R. Bajcsy, *Combining Color and Geometry for the Active, Visual Recognition of Shadows*, University of Pennsylvania Department of Computer & Information Science Technical Report No. MS-CIS-94-62, 1994.

R. Gershon, A.D. Jepson and J. K. Tsotsos, *Ambient Illumination and the Determination of Material Changes*, J. Opt. Soc.Am. A, 3(10):1700-1707, 1986.

J.M. Geusebroek, R.v.d. Bommgard and A.W.M. Smeulders, *Color Invariance*, IEEE Trans. On Pattern Analysis and Machine Intelligence, 23(12):1338-1350, Dec. 2001.

G.E. Healey, *Using Color for Geometry-Insensitive Segmentation*, J. Opt. Soc.Am. A, 6(6):920-937, Jun. 1989.

R. Hooke and T.A. Jeeves, *Direct Search Solution of Numerical and Statistical Problems*, Journal of the Association of Computing Machinery (JACM). Apr. 1961: vol. 8, Issue 2, pp. 212 to 229.

B.K.P. Horn, *Determining Lightness from an Image*, Computer Graphics and Image Processing, 3(1):277-299, Dec. 1974.

S. Kirkpatrick, C.D. Gelatt. and M.P. Vecchi, *Optimization by Simulated Annealing*, Science. May 13, 1983: vol. 220, No. 4598, pp. 671 to 680.

G.J. Klinker, S.A. Shafer and T. Kanade, *A Physical Approach to Color Image Understanding*, International Journal of Computer Vision, 4(1): 7-38, Jan. 1990.

E.H. Land and J.J. McCann, *Lightness and Retinex Theory*, J. Opt. Soc.Am. A, 61:1-11, 1971.

M.S. Langer, *When Shadows Become Interreflections*, International Journal of Computer Vision, 34(2/3), 193-204, 1999.

J.A. Marchant and C.M. Onyango, *Shadow-Invariant Classification for Scenes Illuminated by Daylight*, J. Opt. Soc.Am. A, 17(11), Nov. 2000.

S.K. Nayar, K. Ikeuchi and T. Kanade, *Shape from Interreflections*, IEEE International Conference onn cOmputr Vision (ICCV), pp. 2-11, Dec. 1990.

C. Reeves, ed. *Modern Heuristic Techniques for Combinatorial Problems.* New York: John Wiley and Sons, Inc., 1993 ISBN:0-470-22079-1.

I. Omer and M. Weyman, *Color Lines: Image Specific Color Representation*, Proceeding of IEEE Conference on Computer Vision and Patter Recognition, pp. 946-953, Jun. 2004.

S.A Shafer, *Using Color to Separate Reflection Components*, Computer Science Department University of Rochester, TR 136, Apr. 1984.

S. Tominaga, *Surface Identification Using Dichromatic Reflection Model*, IEEE Transactions of Pattern Analysis and Machine Intelligence, 13(7), pp. 658-670, Jul. 1991.

S. Tominaga and N. Tanaka, *Estimating Reflection Parameters from a Single Color Image*, IEEE Comput. Graph. Appl., 20(5):58-66, 2000.

J.v.d. Weijer and C. Schmid, *Coloring Local Feature Extraction*, pp. 1-14, date: 2006.

H. G. Barrow and J. M. Tenenbaum. Recovering intrinsic scene characteristics from images. In A. R. Hanson and E. M. Riseman, editors, Computer Vision Systems, pp. 3-26, New York, 1978. Academic Press.

\* cited by examiner

```
18
        Image File
P(1,1)  P(1,2)   • • •                    • • •  P(1,M)
P(2,1)  P(2,2)                                    .
P(3,1)  P(3,2)                                    .
                                                  .
 .
 .
 .

Figure 3. (a) Original image, (b) material image, and (c) illumination image

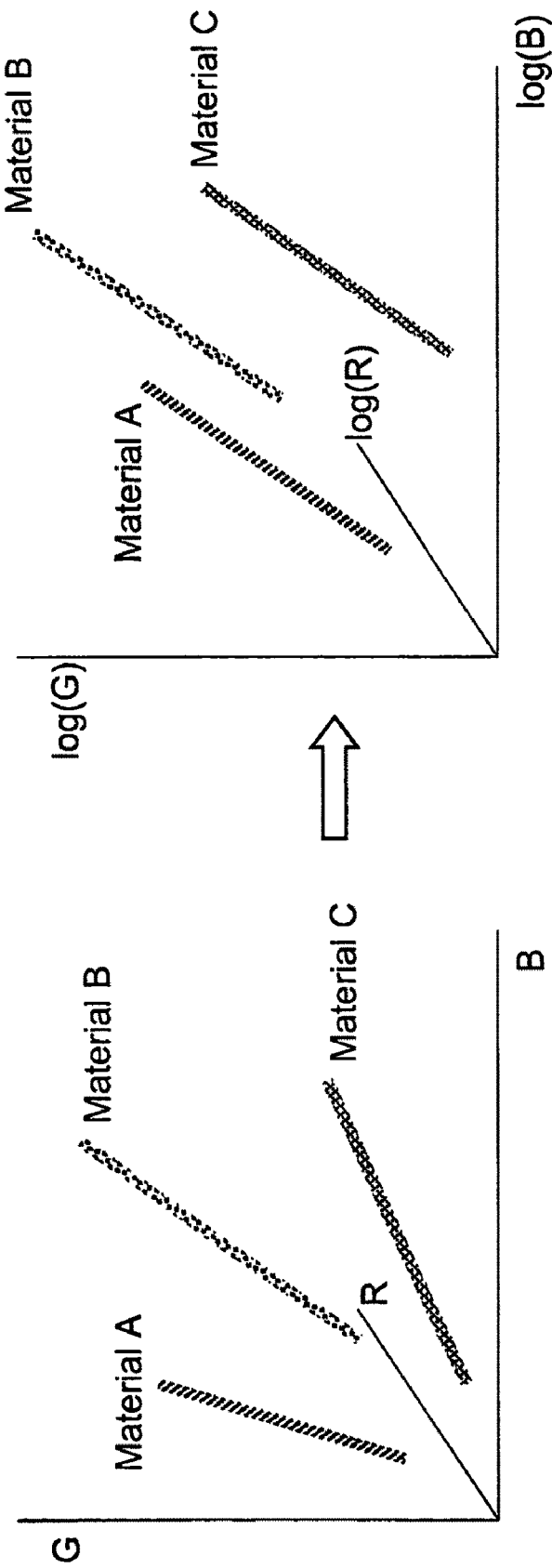
Figure 5a: Log Color Space

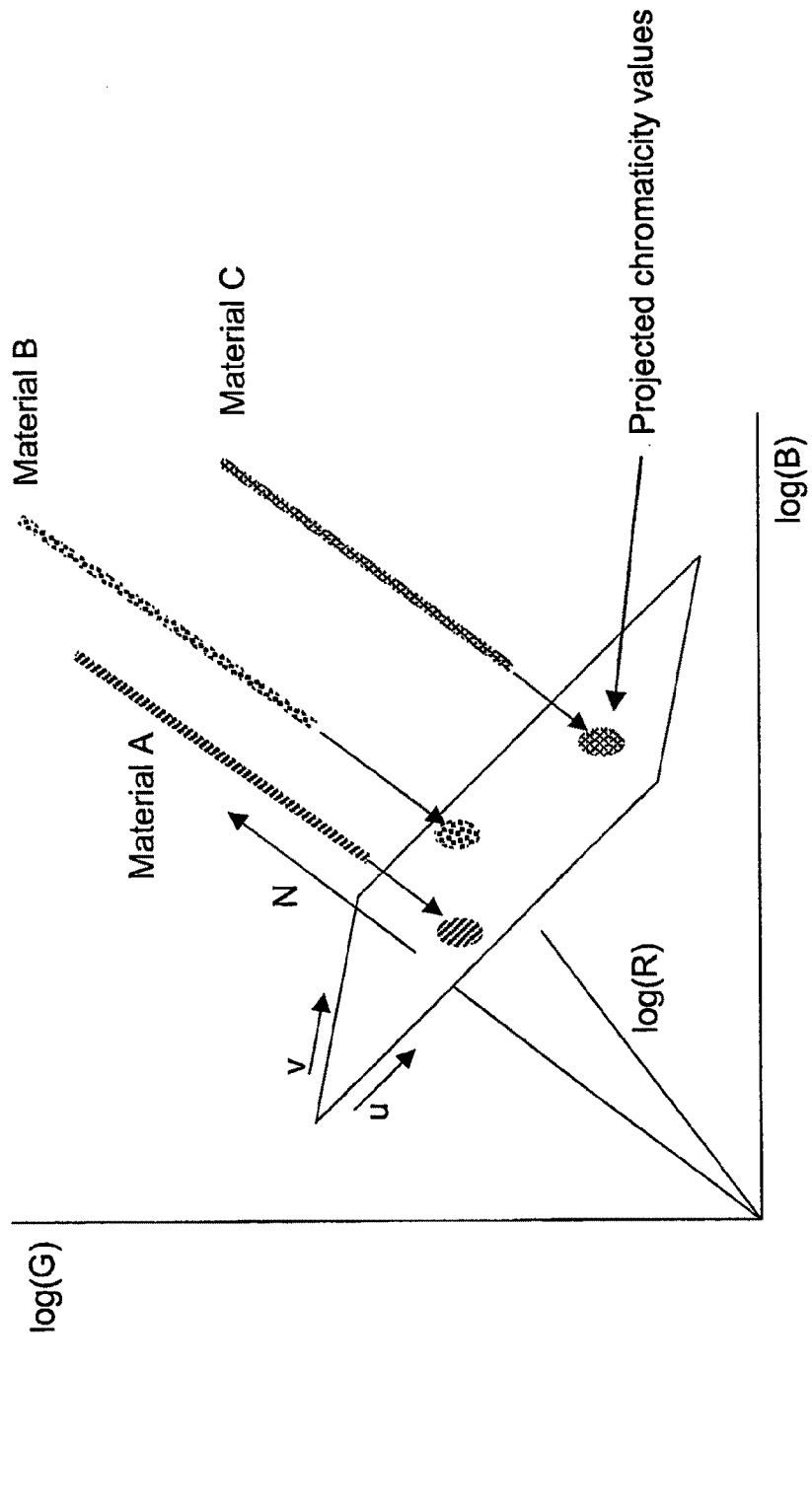
Figure 5b: Log Color Space Chromaticity Plane

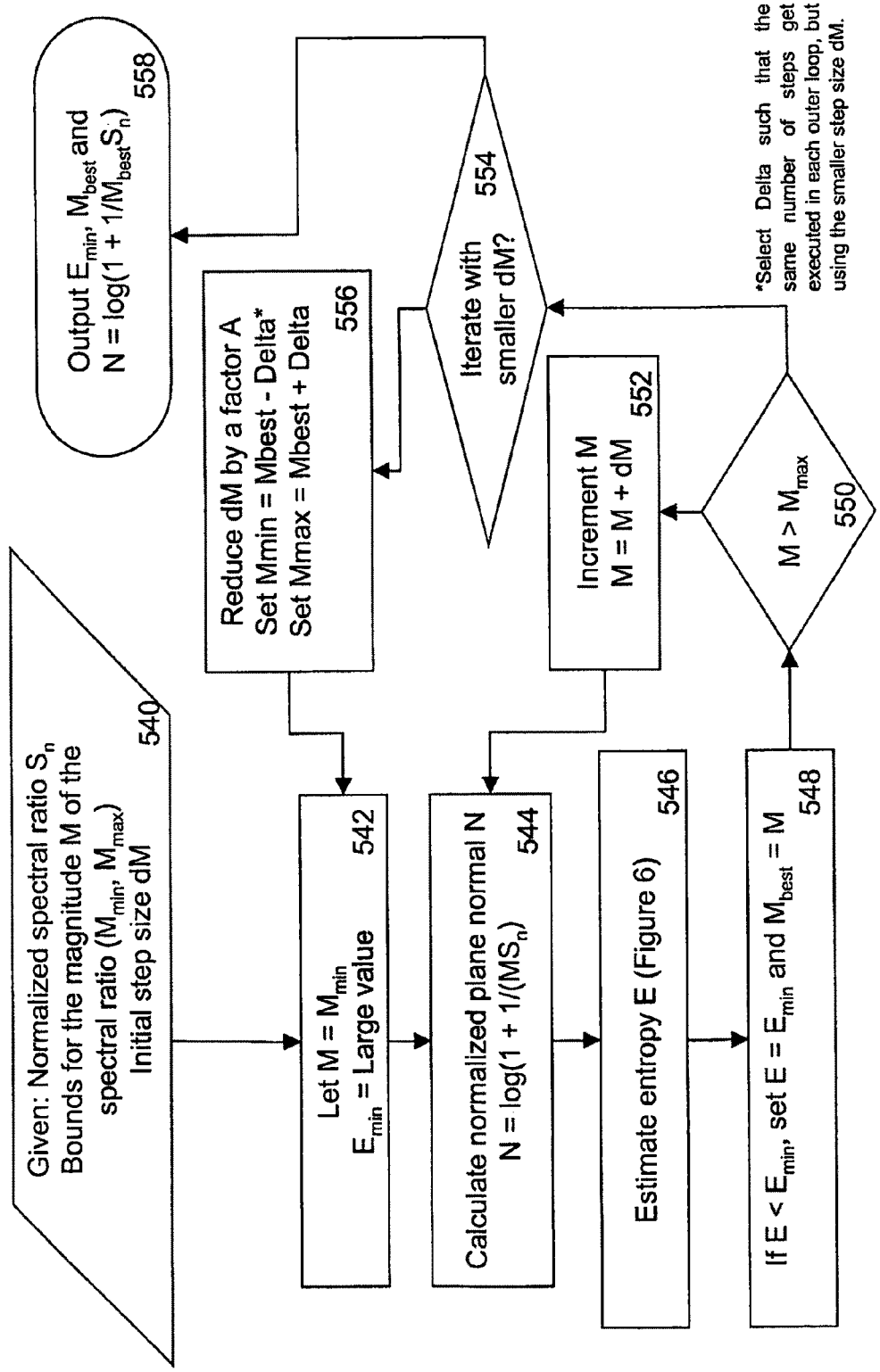
Figure 5c: Constrained Search Method for Selecting N

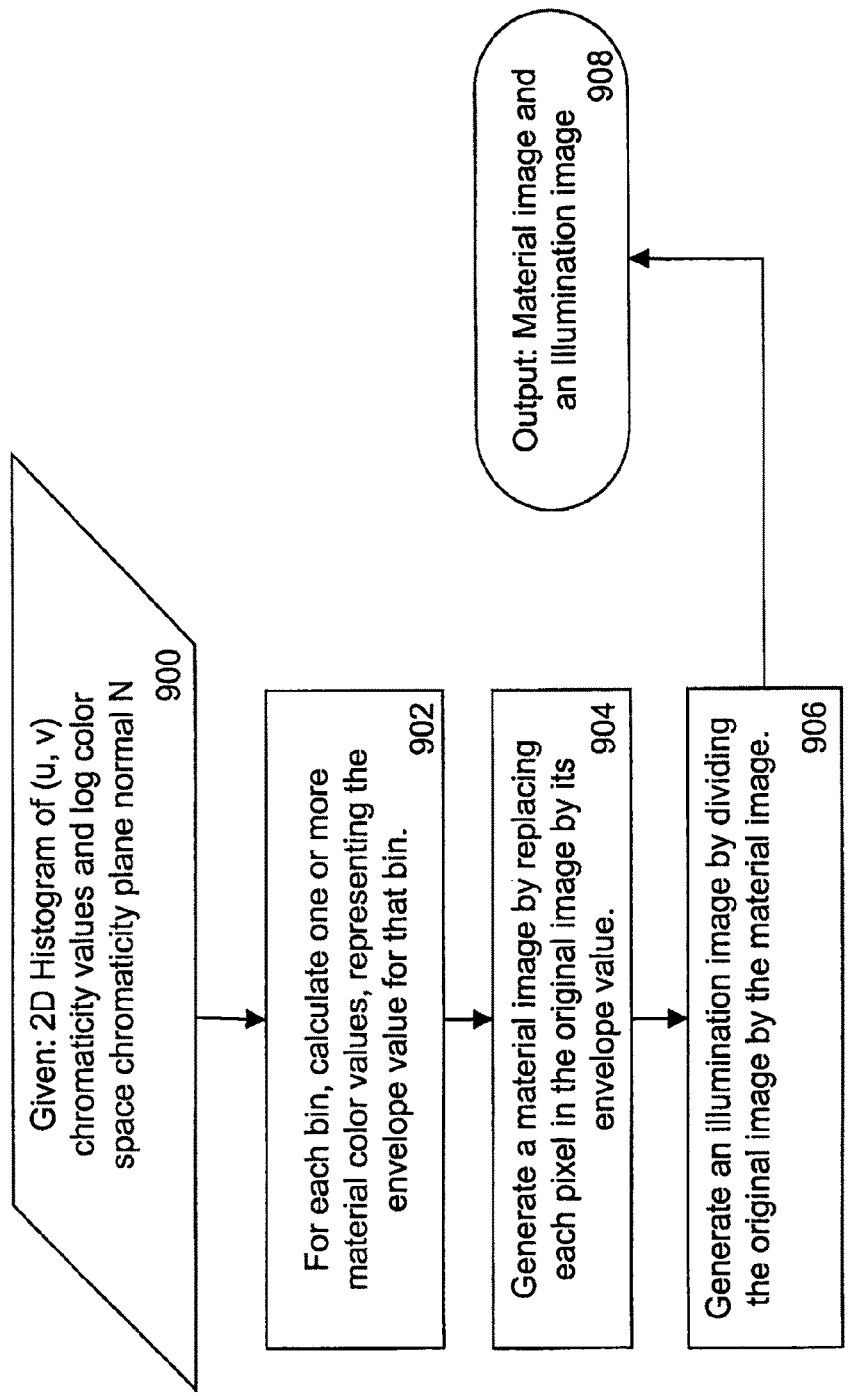
Figure 5d: Separating Illumination and Reflectance

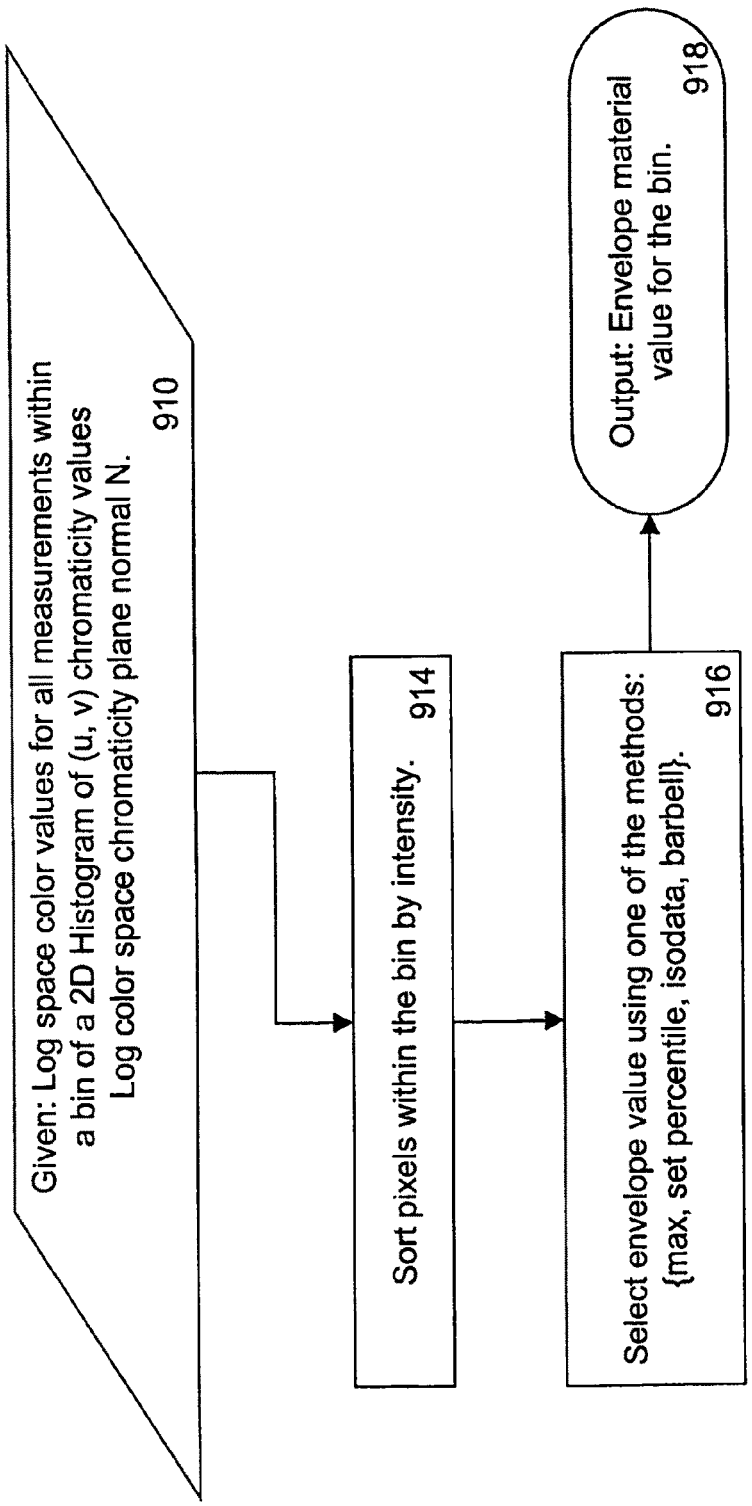
Figure 5e: Calculating the Max Envelope Value

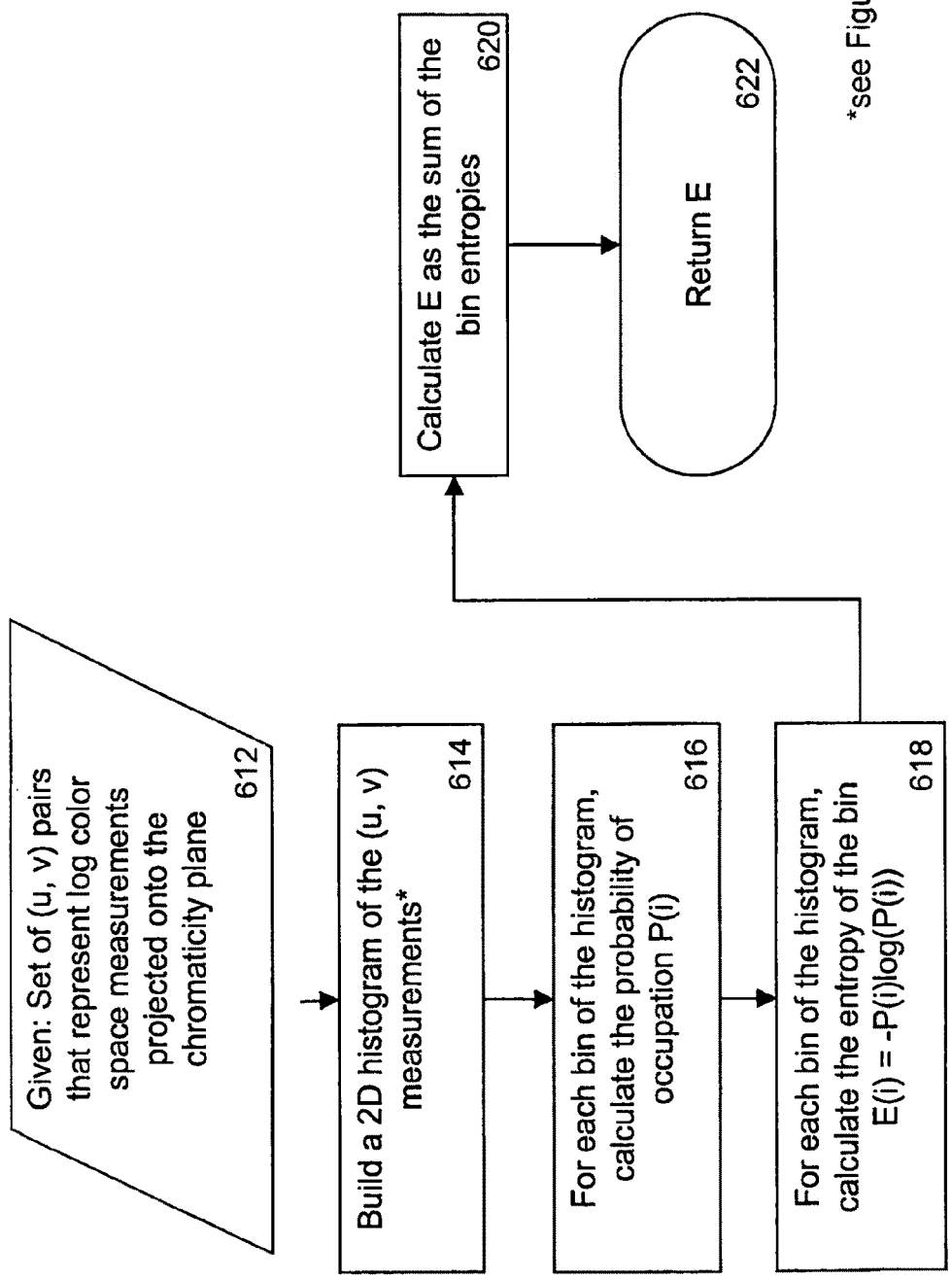
Figure 6a: Histogram-based Entropy Estimation

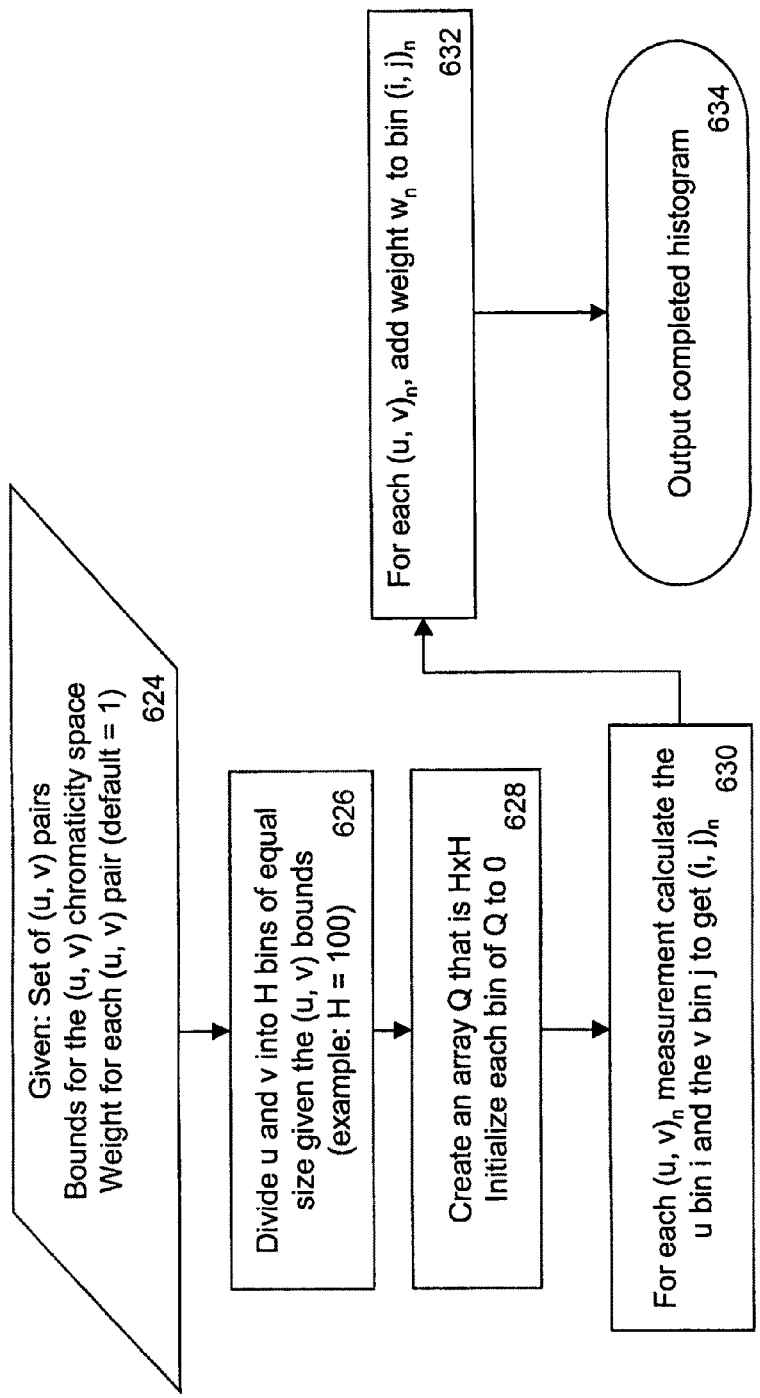
Figure 6b: Method for Creating a (u,v) Chromaticity Histogram

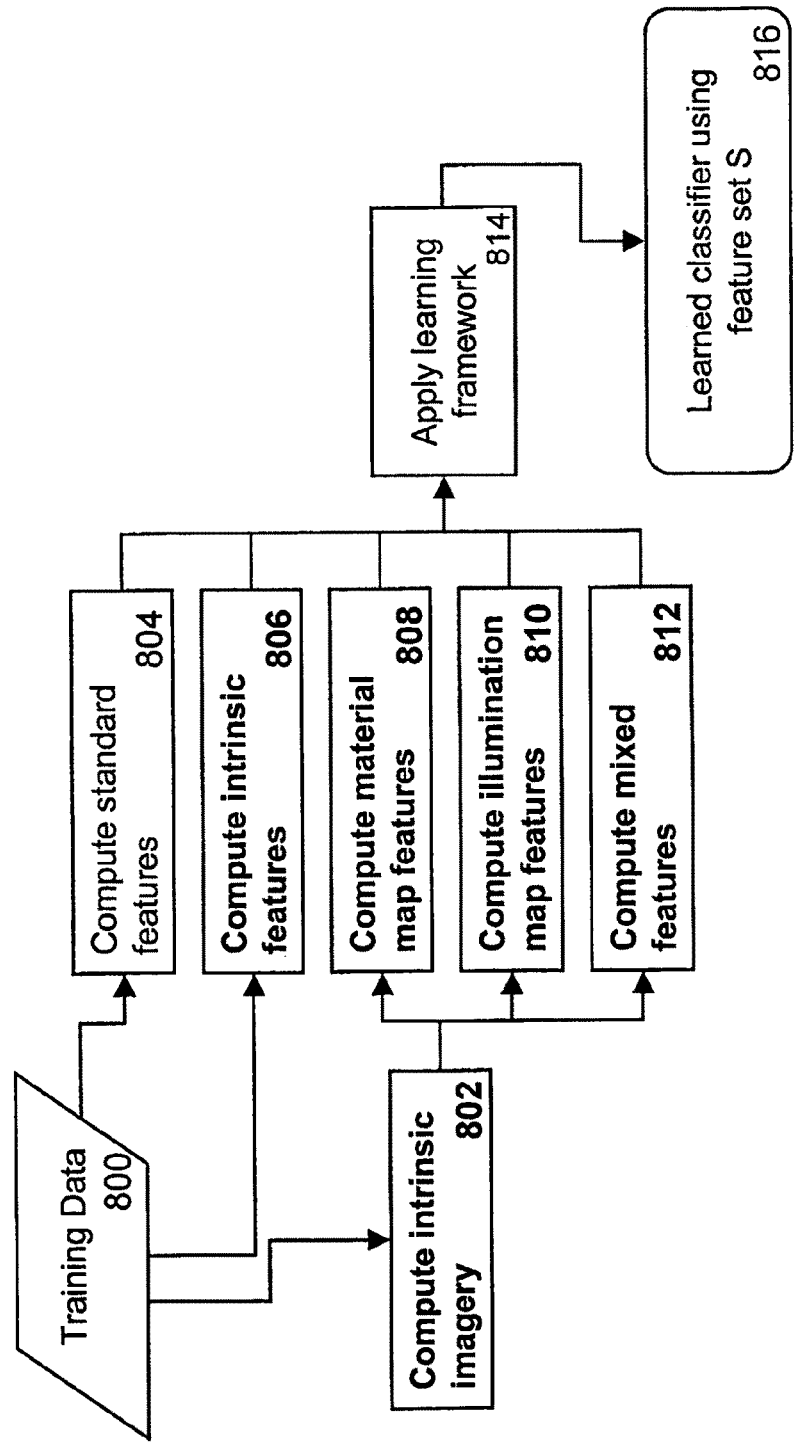

METHOD AND SYSTEM FOR LEARNING OBJECT RECOGNITION IN IMAGES

This application is a divisional of U.S. patent application Ser. No. 11/600,624, filed Nov. 16, 2006, which is hereby incorporated by reference herein.

BACKGROUND OF THE INVENTION

Computer learning techniques have been implemented in computer systems, and effectively used in an analysis of images, to, for example, identify objects of interest to a user. Learning frameworks provide a method for computers to discover important characteristics or features of a selected object, such as, for example, a human face. In some known learning frameworks, the features used by the system are preselected by the user, and the framework learns the relative utility, useful ranges, or relationships between the features that can then be used by the computer system to identify the selected objects of interest that may appear in an image. In other known systems, a large set of features is evaluated by the learning framework, for identification of particular features that are important to an object identification task.

In real world environments, an object recognition system must be able to function under a wide variety of illumination conditions, including shadows, and distinguish among significant variations of object types. For example, a system set up to identify automobiles analyzes an image for features indicative of the structure of an automobile. However, an automobile depicted in the image can have characteristic features that vary in color, orientation, appear in shadow, or have features that cast a shadow, thereby altering the shape of the object as ascertained by the computer system. Thus, the learning framework must include considerable details not only on characteristic features per se, but also on how perception of each characteristic feature can be altered by varying illumination in a scene depicted in an image. One known approach to achieving an illumination and color invariant system is to use differential or frequency based features of grayscale imagery. However, the real world consequences of varying illumination adds a complexity to the image analysis that can affect the efficiency and accuracy of an object recognition system.

SUMMARY OF THE INVENTION

The present invention provides a method for improving computer learning techniques for image analysis, such as, for example, object recognition through the implementation and integration of an analysis of illumination flux in the image.

In a first exemplary embodiment of the present invention, an automated, computerized method for learning object recognition in an image is provided. According to a feature of the present invention, the method comprises the steps of providing a training set of standard images, calculating intrinsic images corresponding to the standard images and building a classifier as a function of the intrinsic images.

In a second exemplary embodiment of the present invention, an automated, computerized method for recognizing an object in an image is provided. According to a feature of the present invention, the method comprises the steps of generating a classifier and utilizing the classifier to identify objects of interest in an image comprising a standard image and a corresponding intrinsic image.

In a third exemplary embodiment of the present invention, an automated, computerized method for recognizing an object in an image is provided. According to a feature of the present invention, the method comprises the steps of providing a classifier, providing an image, calculating an intrinsic image corresponding to the image, and utilizing the classifier to identify objects of interest in the intrinsic image.

In a fourth exemplary embodiment of the present invention, a computer system comprises a CPU and a memory storing image files, each defining an image comprising an array of pixels. Pursuant to a feature of the present invention, the CPU is arranged and configured to execute a routine: to provide a training set of standard images, to calculate intrinsic images corresponding to the standard images, and to build a classifier as a function of the intrinsic images.

In a fifth exemplary embodiment of the present invention, a computer system comprises a CPU and a memory storing image files, each defining an image comprising an array of pixels. Pursuant to a feature of the present invention, the CPU is arranged and configured to execute a routine: to generate a classifier and to utilize the classifier to identify objects of interest in an image comprising a standard image and a corresponding intrinsic image.

In a sixth exemplary embodiment of the present invention, a computer system comprises a CPU and a memory storing image files, each defining an image comprising an array of pixels. Pursuant to a feature of the present invention, the CPU is arranged and configured to execute a routine: to provide a classifier, to provide an image, to calculate an intrinsic image corresponding to the image, and to utilize the classifier to identify objects of interest in the intrinsic image.

In a seventh exemplary embodiment of the present invention, an automated, computerized method for recognizing an object in an image is provided. According to a feature of the present invention, the method comprises the steps of providing a classifier generated as a function of intrinsic images derived from a standard image training set and selected from the group consisting of a material image and an illumination image, and utilizing the classifier to identify objects of interest in an image.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

BRIEF DESCRIPTION OF THE DRAWINGS

FIG. 2 shows an n×m pixel array image file for an image stored in the computer system of FIG. 1.

FIGS. 5a-e show a sequence of flow charts and graphs relating to a method for generating intrinsic images, according to a feature of the present invention.

FIGS. 6a-b illustrate flow charts relating to an estimation of entropy, for use in the sequence of flow charts of FIGS. 5a-e.

FIG. 7 is a flow chart for executing a classifier learning routine, according to a feature of the present invention.

DETAILED DESCRIPTION OF THE PREFERRED EMBODIMENTS

Figure 1:
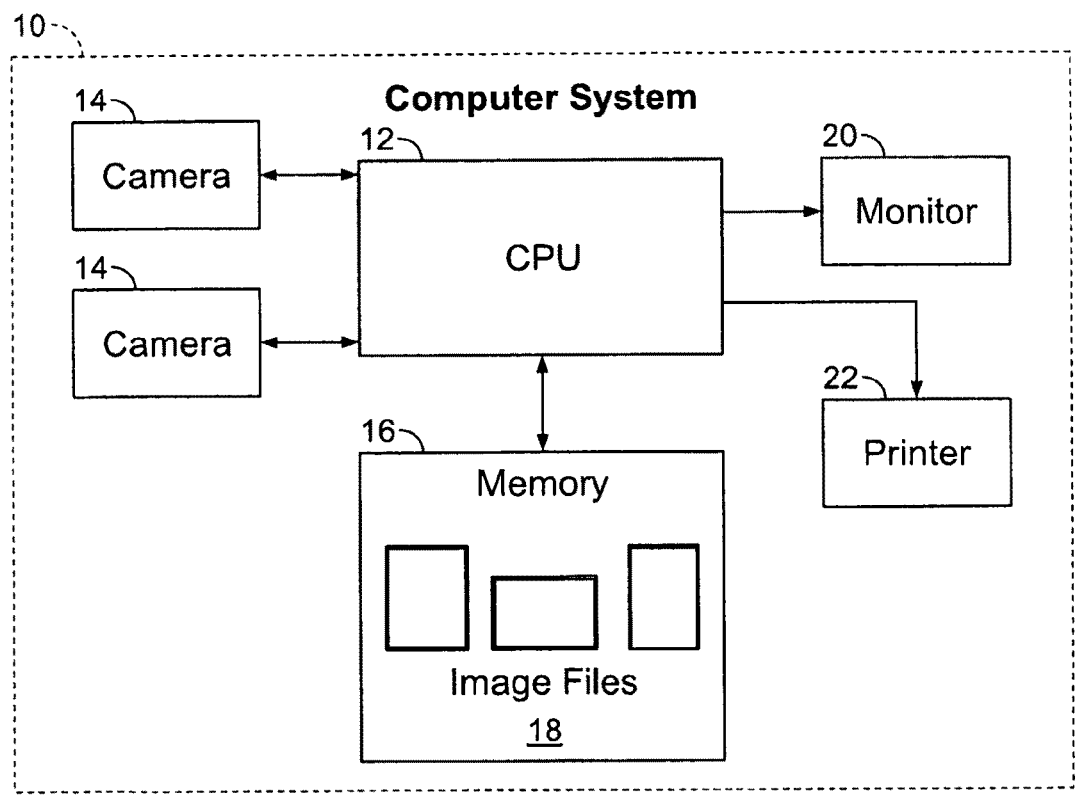
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a camera 14 via, for example, a USB port. The camera 14 can comprise a digital camera, video camera, a stereo pair of cameras or any other arrangement of movie or still camera apparatuses. The camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of N color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18, a stereo pair of image files 18, video sequences of image files 18, and so on, to achieve various objectives, such as, for example, object recognition. There are various known computer learning techniques that can be utilized to perform an object recognition task. These include a feature-based learning framework, an appearance-based learning framework, shape-based analysis and classification, and model-based object recognition.

In each of the known techniques, standard images are used in the development of a training set, and application of the technique in object recognition operations. A standard image is defined as an image, as recorded by the camera 14, including the effects of the illumination flux present at the time the camera 14 recorded the image. The standard images are the result of illumination interacting and reflecting from materials. As noted, the extensive variations of illumination, and resulting shadows, confound an object's appearance, and thus cause a significant increase in the complexity of the object recognition task.

Figure 3A:
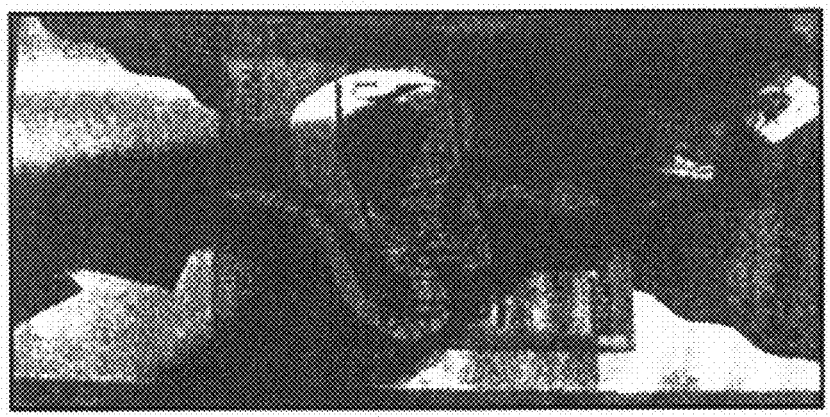
FIGS. 3a-c depict examples of a standard image and corresponding intrinsic images, according to a feature of the present invention.
Figure 3B:
Figure 3C:
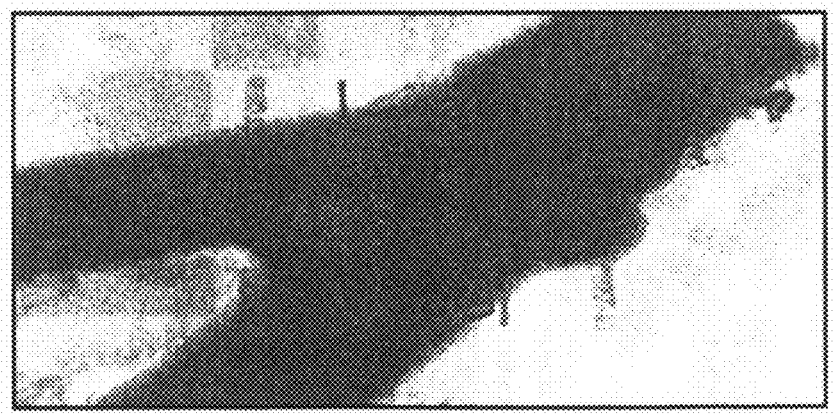

Pursuant to a feature of the present invention, the object recognition task is advantageously simplified by processing intrinsic images corresponding to the standard images. Intrinsic images show, in separate images or image maps, each of material aspects and illumination flux aspects of the standard image. Referring to FIGS. 3a-c, there is shown examples of a standard image and the corresponding intrinsic images, according to a feature of the present invention. FIG. 3a illustrates an example of a standard image. As shown, a poster is set against a background with an illumination that causes an extensive shadow to extend across the poster. FIGS. 3b & c show the intrinsic images that correspond to the standard image of FIG. 3a. As generated, pursuant to a feature of the present invention, FIG. 3b is a material map or image showing all material aspects of the image of FIG. 3a, without any effects of a variable illumination, such as, for example, the shadow depicted in FIG. 3a. FIG. 3c is an illumination map or image that shows the illumination flux intensity throughout the standard image of FIG. 3a.

As taught in application Ser. No. 11/341,742, filed on Jan. 27, 2006, entitled: "Method and System For Identifying Illumination Flux In An Image," now issued as U.S. Pat. No. 7,672,530 on Mar. 2, 2010, which is hereby incorporated by reference, an image comprises two components, material and illumination. Moreover, as further taught in the Application, an illumination flux impinging on a material depicted in an image is a bi-illuminant flux which comprises an ambient illuminant and a direct or incident illuminant. The incident illuminant is light that causes a shadow and is found outside a shadow perimeter. The ambient illuminant is light present on both the bright and dark sides of a shadow, but is more perceptible within the dark region of a shadow.

Thus, in FIG. 3c, the darker area, corresponding to the shadow of FIG. 3a, is illuminated by the ambient illuminant, and the brighter area is illuminated by the combination of the incident illuminant and the ambient illuminant. As will appear, the task of recognizing the poster is simplified by analyzing material features absent the shadow aspects depicted in the standard image of FIG. 3a (as shown in FIG. 3b), as well as features of the illumination flux present in the standard image (as shown in FIG. 3c).

Figure 4:
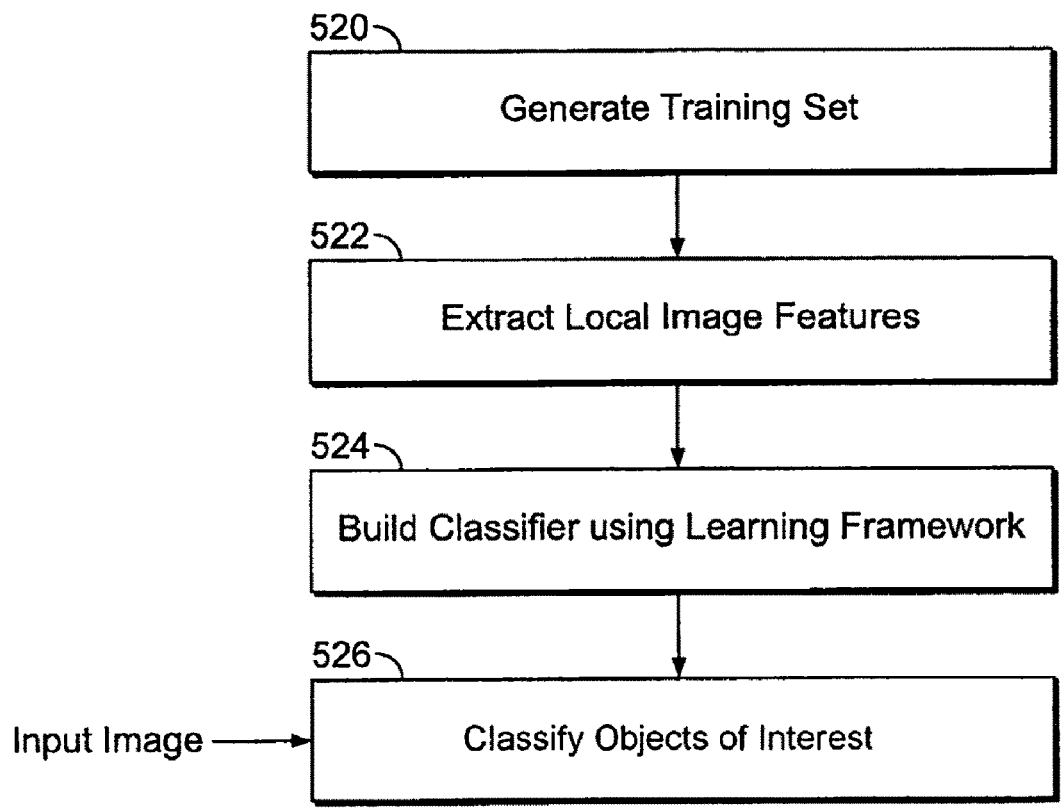
FIG. 4 is a flow chart for performing a computer learning technique to learn object recognition, according to a feature of the present invention.

FIG. 4 is a flow chart for performing an exemplary computer learning technique to learn object recognition. The procedure includes, in an object recognition task, the steps of generating a training set (step 520) (the object training set), extracting from the object training set local image features corresponding to an object of interest to be identified, as a learning framework (step 522), building a classifier from the learning framework, for use in the learning technique to identify instances of the object of interest in a selected image file 18 (step 524) and classification of object features in an image by applying the classifier to identify the object of interest in the selected image file 18 (step 526).

In step 520, an object training set is input to the CPU 12. The object training set comprises a set of examples of images having the object of interest. Typically, a user selects images having positive examples of the object of interest to be identified. The object training set comprises standard images, and according to a feature of the present invention, intrinsic images corresponding to the standard images, each depicted in a corresponding image file 18. The examples include positive examples of the object of interest to be identified in images recorded by the camera 14. The object training set also includes negative examples, i.e., images without the objects of interest. For an effective and comprehensive training set, thousands of positive and negative examples are included in the set.

Generation of the intrinsic images from the standard images of the object training set can be implemented using any one of several techniques. For example, a computer system can learn what an illumination edge looks like in grayscale imagery and then use that knowledge to classify every pixel in the image as to whether it is an illumination edge or not. A full description of such a technique for generating intrinsic images can be found in M. F. Tappen, W. T. Freeman, and E. H. Adelson, "Recovering Intrinsic Images from a Single Image," IEEE Transactions on Pattern Analysis and Machine Intelligence, Volume 27, Issue 9, September 2005, Pages 1459-1472.

According to a feature of the present invention, intrinsic images can also be generated utilizing a technique based upon a bi-illuminant chromaticity plane in a log color space and a projection of log color space values to the chromaticity plane to provide chromaticity representation values corresponding to the pixels of a subject standard image. As taught in application Ser. No. 11/403,719, filed on Apr. 13, 2006, entitled: "Method And System For Separating Illumination And Reflectance Using A Color Log Space," now issued as U.S. Pat. No. 7,596,266 on Sep. 29, 2009, which is hereby incorporated by reference, manipulation of the image to modify a shadow or to make a color correct brightness adjustment or a illumination invariant version of an image is achieved in a manner that accommodates the fact that a material in shadow interacts with an illumination flux that is different from the illumination flux impinging upon a lit area of the material.

As noted above, an illumination flux impinging on a material depicted in an image is a bi-illuminant flux which comprises an ambient illuminant and a direct or incident illuminant. According to a feature of the present invention, a useful characterization of the appearance of materials under two illuminants in a log color space is derived from a bi-illuminant dichromatic reflection model (BIDR) of the image. The BIDR model indicates the appearance of a material surface that interacts with an illumination flux comprising an incident illuminant and an ambient illuminant having different spectra. The BIDR model predicts that the color of a specific material surface is different in shadow than the color of that same surface when partially or fully lit, due to the differing spectra of the incident illuminant and the ambient illuminant. The BIDR model also predicts that the appearance of a single-color surface under all combinations of the two illuminants (from fully lit to full shadow) is represented by a line in a linear color space, such as, for example, an RGB color space, that is unique for the specific material and the illuminant combination interacting with the material, as clearly illustrated by the line representations of Material A, Material B and Material C depicted in an image file 18, in the RGB graph of FIG. 5a.

In a simplified version, the BIDR model can be stated as: $I(x, y, z, \lambda) = c_b(\lambda) D(\lambda) \gamma b + c_b(\lambda) A(\lambda)$, where $I(x, y, z, \lambda)$ is the radiance of the surface depicted in the image at point (x, y, z) for the wavelength $\lambda$, $c_b(\lambda)$ is the body reflection (material) intensity at the wavelength $\lambda$, $D(\lambda)$ is the direct or incident illuminant intensity at the wavelength $\lambda$, $\gamma b$ is the fraction of direct illuminant visible at the point (x, y, z) with $\gamma b=1$ corresponding to a fully lit value (Bright) and $\gamma b=0$ corresponding to a full shadow (Dark), and $A(\lambda)$ is the ambient illumination intensity at the wavelength $\lambda$. The BIDR model is an accurate depiction of color variation due to the interplay of the incident illuminant and the ambient illuminant on a material, from shadow to fully lit. For a more detailed description of the BIDR model, reference should be made to co-pending application Ser. No. 11/341,751, filed Jan. 27, 2006, entitled: "Bi-illuminant Dichromatic Reflection Model For Image Manipulation," now published as U.S. Patent Application Publication 2007/0176940 on Aug. 2, 2007, which is hereby incorporated by reference.

According to a feature of the present invention, the BIDR model material lines, for example, the Material A, B, C lines depicted in the RGB graph of FIG. 5a, when transformed to log values, are depicted as corresponding log values in the log(R), log(G), log(B) graph of FIG. 5a. As a result of the mathematical properties of logarithmic values, the log transforms of the material lines A, B, C form parallel lines, when the image has a neutral or unsaturated spectral ratio, as clearly shown in the log graph of FIG. 5a. Because of the mathematical properties of the logarithmic color values, it is possible to find a bi-illuminant chromaticity plane in the log color space, when properly aligned, where all of the fully lit (Bright) and fully shadowed (Dark) pixels of a given material surface of an image file 18 project on top of one another, even for very saturated spectral ratios, producing a two dimensional chromaticity co-ordinate for the material surface that is illumination invariant, as fully described in co-pending application Ser. No. 11/403,719.

FIG. 5b is a graphic representation of a log color space, bi-illuminant chromaticity plane according to a feature of the present invention. The alignment of the chromaticity plane is determined by the vector N, normal to the chromaticity plane, and defined as $N=\log(Bright_{vector})-\log(Dark_{vector})=\log(1+1/S_{vector})$ (wherein $S_{vector}=Dark_{vector}/(Bright_{vector}-Dark_{vector})$). The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 5b. Thus, the RGB values of each pixel in an image file 18 can be mapped by the CPU 12 from the image file value p(n, m, R, G, B) to a log value, then, through a projection to the chromaticity plane, to the corresponding u, v value, as shown in FIG. 5b. Each pixel p(n, m, R, G, B) in the image file 18 is then replaced by the CPU 12 by a two dimensional chromaticity value: p(n, m, u, v), to provide a chromaticity representation of the original RGB image. The chromaticity representation is a truly accurate illumination invariant representation because the BIDR model upon which the representation is based, accurately and correctly represents the illumination flux that caused the original image.

Referring now to FIG. 5c, there is shown a flow chart illustrating a constrained search method for estimating the chromaticity plane normal, N, according to a feature of the present invention. In step 540, the CPU 12 receives as input a normalized spectral ratio for the Bright and Dark color values of an image depicted in an image file 18, $S_n$ (normalized value of $S_{vector}$), having an hypothesized length, M, and minimum and maximum bounds ($M_{min}$, $M_{max}$) for the magnitude of M. For example, $M_{min}=0.1$, and $M_{max}=1.0$. M $S_n$ comprises an unnormalized hypothesized spectral ratio for the image. The CPU 12 also receives as an input an incremental value for the magnitude, dM, which, in our example, can be set at 0.01, to provide 90 incremental steps between an $M_{min}=0.1$ and an $M_{max}=1.0$.

In step 542, the CPU 12 lets $M=M_{min}$, and sets a minimum entropy value, $E_{min}$ equal to an arbitrarily large value. In step 544, the CPU 12 calculates a plane normal, N, for a first selected chromaticity plane for estimation of entropy, utilizing the algorithm: $N=\log(1+1/(M S_n))$. The log RGB values derived from an image file 18 are projected to the selected chromaticity plane. In step 546, the CPU 12 estimates the entropy for the distribution of the projections for the current selected chromaticity plane normal, N, through execution of the routine illustrated in FIG. 6a.

FIG. 6a is a flow chart for performing a histogram-based entropy estimation according to a feature of the present invention (step 546 of FIG. 5c). In step 612 of the flow chart of FIG. 6a, the CPU 12 starts with the set of (u, v) pairs representing the log color space measurements projected onto the current chromaticity plane. In step 614, the CPU 12 builds a chromaticity histogram of the (u, v) measurements.

FIG. 6b is a flow chart illustrating a method for creating a chromaticity histogram according to a feature of the present invention. In step 624, the CPU 12 is input the set of (u, v) pairs, and sets bounds for the (u, v) chromaticity space to be depicted by the histogram. The bounds can be related to the range of RGB color values of the pixel array in the source image file 18. A weight is also assigned to correspond to each (u, v) pair corresponding to a projected log RGB value, for example, w=1.

In step 626, the histogram space is divided into H equal sized bins in each dimension of the chromaticity plane, for example, H=100). In step 628, the CPU 12 creates an array Q of H×H bins, and initializes each bin to 0. In step 630, the CPU 12 calculates the corresponding bin for each (u, v)n co-ordinate pair of the projected log RGB values in the current selected orientation of the chromaticity plane. Each bin H can be defined by co-ordinates i, j, that provide a unique $(i, j)_n$ designation for each bin H. The i co-ordinate is the location number of the bin H along the u axis, and the j co-ordinate is the location number of the bin H along the v axis of the corresponding chromaticity plane. Accordingly, for each $(u, v)_n$ pair, the CPU 12 determines the bin i for the u value of the current pair, and the bin j for the v value, resulting in the specific $(i, j)_n$ designation for the specific bin H where the current $(u, v)_n$ pair is located.

In step 632, the CPU 12 assigns a weight, $w_n$, to each bin H. The weight for the bin equals the sum of the weights of the total number $(u, v)_n$ pairs found in the corresponding bin by execution of step 530 by the CPU 12. In our example, the weight of each (u, v) pair is 1. In step 634, the CPU 12 outputs the histogram which comprises the bin array, with each bin, H being highlighted as a function of the weight of the bin and the location of the (u, v) pairs within the bin. Accordingly, the bins of the generated histogram show the distribution of log RGB values across the chromaticity plane.

Returning now to FIG. 6a, the completion of the routine of FIG. 6b completes step 614 of FIG. 6a. In step 616, for each bin of the histogram, the CPU 12 calculates the probability of occupation P(i). The probability of occupation of (u, v) measurements within a specific bin H is determined by the fraction of measurements within the bin ($(u, v)_n$ pairs in the bin $(i, j)_n$/total (u, v) pairs in the current chromaticity plane). Thereafter, in step 618, the CPU 12 calculates the entropy for each bin H as a function of the probability of the bin, E(i)=−P(i) log(P(i)). In step 620, the CPU 12 calculates the total entropy for the current selected orientation for the chromaticity plane: $E=\Sigma_I -P(i)\log(P(i))$. In step 622, the CPU 12 returns the E for the current orientation.

Upon completion of the entropy estimation routine (step 546 of FIG. 5c), the CPU 12, in step 548, determines if the estimate for $E<E_{min}$. If $E<E_{min}$, the CPU 12 sets $E=E_{min}$ and $M_{best}=M$. The CPU 12 then proceeds to decision block 550, where the CPU 12 determines if $M>M_{max}$.

If $M<M_{max}$, the CPU 12 proceeds to step 552, to increment M:M=M+dM. Once the value of M has been incremented, the CPU 12 returns to repeat steps 544-548 to estimate entropy for a new selection for N, and then returns to step 550 to once again test for $M>M_{max}$.

If $M>M_{max}$, the CPU 12 proceeds to step 554. In step 554, the CPU 12 determines if a further iteration is to be executed with a smaller dM. The decision can be based upon, for example, how much $E_{min}$ has changed since the last iteration through possible values of M.

If the decision is to proceed to iterate with a smaller dM, the CPU 12 proceeds to step 556. In step 556, the CPU 12 reduces dM by a factor A. In our example, dM was initially set at 0.01. A could be, for example, 0.1, reducing the original dM from 0.01 to 0.001. The CPU 12 also sets $M_{min}=M_{best}$−Delta, and $M_{max}=M_{best}$+Delta. In our example, Delta can be set at 0.045, and thus the search will continue from (0.4−0.045) to (0.4+0.45), or (0.355 to 0.445) with a dM of 0.001. The CPU 12 then repeats steps 542 to 550 for the new set of values.

If the decision is not to proceed to iterate with a smaller dM, the CPU 12 proceeds to step 558. In step 558, the CPU 12 outputs $E_{min}$, $M_{best}$, and N=log(1+1/($M_{best}$ Sn)).

Referring now to FIG. 5d, there is shown a flow chart for separating illumination from reflectance in an image using a chromaticity plane as estimated by the CPU 12, according to a feature of the present invention. In step 900, the CPU 12 receives as input a two dimensional histogram of (u, v) chromaticity values divided into bins, and a log color space chromaticity plane normal, N, as generated by the CPU 12 through execution of the routine of FIG. 5c. In step 902, the CPU 12 examines each bin H of the histogram to calculate an envelope value for each bin. An envelope value can be determined by the CPU 12 through execution of the routine of FIG. 5e, as will be described below. For example, each bin contains a variety of pixel value projections, (u, v) pairs formed by the projections from the log color space. Within each bin, the (u, v) pairs correspond to pixels that vary in intensity, representing a variety of illumination conditions. The CPU 12 selects a "brightest" (as will be defined below) value from each bin as a max envelope representation of the bin. An envelope value determination yields a set of bright pixels, one from each bin, to provide a rough approximation of all fully lit colors in the original image.

Thereafter, in step 904, the CPU 12 generates a material image by replacing the RGB value of each pixel of an image file 18, by the corresponding envelope value. The RGB values of each pixel in an image file 18 can be mapped by the CPU 12 from the image file value p(n, m, R, G, B) to a log value, then, through a projection to the chromaticity plane, to the corresponding bin H. Each pixel p(n, m, R, G, B) in the image file 18 is then replaced by the CPU 12 by the envelope value for the bin containing the log color space value projection: p(n, m, Envelope value), to provide an all bright illumination material color version of the original image.

In step 906, the CPU 12 generates an illumination image by dividing the original image by the material image generated in step 904. The division is carried out pixel by pixel, applying the algorithm: image=material*illumination. In step 908, the CPU 12 outputs the material image and the illumination image.

FIG. 5e is a flow chart for calculating a max envelope value for each bin of the chromaticity plane (step 902 of FIG. 5d), according to a feature of the present invention. In step 910, the CPU 12 is given the log color space values corresponding to the (u, v) pairs in a selected bin of the chromaticity plane estimated by the CPU 12, and the normal, N for that plane. The CPU 12 then sorts by intensity the values of the colors of the log values for the pixels corresponding to the (u, v) values of the bin (step 914).

In step 916, the CPU 12 selects the envelope value for the bin using one of several methods, for example, max, or set percentile. In max, the CPU 12 simply selects the value with the highest intensity among the pixels corresponding to the (u, v) values of the bin. In set percentile, the CPU 12 selects the value at some fixed percentile of the value range for the bin, for example, the 95$^{th}$ percentile.

After completion of one of the methods of step 916, the CPU 12, in step 918, outputs the envelope value for the selected bin. The CPU 12 repeats the routine of FIG. 5e for each bin of the chromaticity plane to generate a set of envelope values for the bins of the chromaticity plane.

Either of the above-described techniques can be applied to generate intrinsic images that correspond to all or just selected portions of each standard image, for example, when a focus of attention mechanism directs the computer system to restrict analysis to certain portions of each image file 18. If the object recognition task is limited to image files 18 in a static data base, the generation of the corresponding intrinsic images can be performed off line, such as each time the data base is updated. In real time operation, the generation of the intrinsic images is performed on line, real time.

Upon generation of a set of intrinsic images for each standard image, the CPU 12 completes step 520 of the object recognition task of FIG. 4, and proceeds to steps 522 and 524 of FIG. 4. In steps 522 and 524, the CPU 12 operates to extract from the object training set (including standard and intrinsic images) local image features or characteristics corresponding to an object of interest to be identified, as a learning framework, and to apply the learning framework to build an object classifier from the learning framework, for use in the learning technique, to identify instances of the object of interest in image files 18 recorded by the camera 14, respectively.

Key image characteristics are used as an input to a standard classifier, for example, an Adaboost classifier. The Adaboost classifier, in turn, uses the image characteristics to build a profile of the appearance of an object of interest, as is known in the art. Adaboost is a term of art indicating "adoptive boosting." The Adaboost classifier is described in "A Decision Theoretic Generalization of On-Line Learning and an Application to Boosting," Journal of Computer and System Sciences 55 (1997), pp. 119-139.

A description of how boosting works is given in Richard O. Duda, Peter E. Hart, and David G. Stork, *Pattern Classification*, John Wiley & Sons, Inc., 2001 (pp. 476-480) and Trevor Hastie, Robert Tibshirani, and Jerome Friedman, *The Elements of Statistical Learning*, Springer, 2001, (pp. 299-309). The boosting description of the *Pattern Classification* reference can be summarized by the following procedural steps:

Select a subset $n_1$ of the n patterns from the training set D to get $D_1$.

Create a sub-classifier $C_1$ with $D_1$. ($C_1$ can also be called a weak learner).

Choose a second training set $D_2$ such that $C_1$ classifies half of $D_2$ wrong. (The idea is that $D_2$ provides information complementary to $D_2$.) Create sub-classifier $C_2$.

Choose $D_3$ by choosing the training examples such that $C_1$ and $C_2$ do not agree Continue process until some threshold of training error is achieved or until there are no more training examples. The final classification is based on votes of the sub-classifiers.

FIG. 7 is a flow chart for executing a classifier learning routine, according to an exemplary embodiment of the present invention, to complete steps 522 and 524 of FIG. 4. In step 800, the CPU 12 receives the object training set comprising standard images of examples of an object of interest. In step 802, the CPU 12 computes corresponding intrinsic images for each of the set of standard images, as described above. According to a feature of the present invention, with intrinsic images, in, for example, a feature-based learning framework, there are three novel classes of features or characteristics of an object of interest that can be computed from the maps provided by the material image and illumination image of the intrinsic imagery, and then used as a learning framework input to a standard classifier:

1. Features calculated from the material map, for example, gradients, 2nd and higher-order derivatives, wavelets, Fourier coefficients, and so on;

2. Features calculated from the illumination map, for example, gradients, 2nd and higher-order derivatives, wavelets, Fourier coefficients, and so on; and 3. Features calculated from relationships between both maps, for example, differences and sums of features calculated on the individual maps, products and ratios of features, more complex functions such as sums of products, or products of sums.

Similar advantages can be obtained in respect of other types of learning frameworks. For example, an appearance-based learning framework requires large amounts of labeled training data for a variety of orientations and illumination conditions. The appearance-based framework comprises an N-dimensional space where the totality of points in the space correspond to all possible combinations of poses and illumination conditions. Inasmuch as intrinsic images separate the material and illumination aspects of an image, all relevant points can be separated into two distinct spaces, a K-dimensional space for all poses, and an L-dimensional space representing illumination. Each of the separate pose and illumination spaces will potentially be simpler, more compact and more discriminative than the single N-dimensional space calculated for a standard image.

Intrinsic imagery, in particular an illumination map, offers a most appropriate input for shape-based analysis and classification, by removing the effects of material boundaries, and making possible, shape-from-shading analysis on multi-colored or multi-intensity objects.

In steps 804-812, the CPU 12 computes features that are to be used in building the object classifier. The features of each can be analyzed using, for example, an Adaboost classifier algorithm or a known Probabilistic Learning Tree, to determine the most useful characteristic features from a large set of possible features developed as a function of the above described list of possible features of the material and illumination maps provided by the intrinsic images. The selected most useful characteristic features, including features from the intrinsic images, are then utilized as a feature vector to represent each positive example of the object training set (step 814). The feature vectors, are, in turn, used to build, for example, an Adaboost classifier, as the object classifier (step 816).

In step 526 of FIG. 4, the CPU 12 receives an image file 18 as an input, and applies the object classifier developed through execution of FIG. 7, to identify instances of the object of interest, as may appear in the input image file 18. Pursuant to a further feature of the present invention, the input image 18 is also manipulated to compute corresponding intrinsic images corresponding to the input image file 18, using one of the above described techniques, for separate analysis by the object classifier.

In the preceding specification, the invention has been described with reference to specific exemplary embodiments and examples thereof It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for recognizing an object in an image, comprising the steps of:
   providing a classifier;
   providing an image;
   calculating an intrinsic image corresponding to the image; and
   utilizing the classifier to identify objects of interest in the intrinsic image; and
   wherein the step of calculating an intrinsic image corresponding to the image is carried out by providing a BIDR model representation of the image, and generating the corresponding intrinsic image as a function of the BIDR model representation.

2. An automated, computerized method for recognizing an object in an image, comprising the steps of:
   providing a classifier generated as a function of intrinsic images derived from a standard image training set and selected from the group consisting of a material image and an illumination image and further as a function of features from the intrinsic images selected from the group consisting of features calculated from the material images, features calculated from the illumination images, and features calculated from relationships between both the material images and the illumination images; and
   utilizing the classifier to identify objects of interest in an image.

* * * * *